United States Patent Office 3,494,947
Patented Feb. 10, 1970

3,494,947
SULFUR-CONTAINING CARBOXYLIC ACID ESTERS
Henry G. Schutze, Baytown, Tex., and Delos E. Bown, White Plains, N.Y., assignors to Esso Research and Engineering Company
No Drawing. Continuation-in-part of application Ser. No. 343,492, Feb. 10, 1964. This application June 5, 1968, Ser. No. 734,560
Int. Cl. C07c *149/20;* C08f *45/58*
U.S. Cl. 260—481                        8 Claims

ABSTRACT OF THE DISCLOSURE

Novel sulfur-containing ester compounds are formed by reacting a sulfur-containing carboxylic acid with an alcohol derived from a resin acid, e.g., tetrahydroabietyl alcohol, dihydroabietyl alcohol, dehydroabietyl alcohol, tetrahydroprimaric alcohol, dehydroprimaric alcohol, and mixtures thereof.

CROSS-REFERENCE TO RELATED APPLICATIONS

This application is a continuation-in-part of Ser. No. 343,492 filed Feb. 10, 1964, entitled "Oxidation Inhibitor", now abandoned.

BACKGROUND OF THE INVENTION

In the stabilization of polyolefins, such as high molecular weight polypropylene, many problems have been encountered in stabilizing the polyolefins so that the polyolefin may have a wide range of applications. One of the major problems which presently confronts those skilled in the art is to find stabilizer system which not only are useful to prevent oxidative degradation but prevent oxidative degradation under a wide range of operating conditions. In the past the most effective stabilizer systems for polyolefins have been found to contain compounds which were volatile and incompatible with the polyolefin. In fact, the volatility and incompatibility were a definite limit to the effectiveness of the stabilizer systems.

SUMMARY OF THE INVENTION

The present invention is directed to new high molecular weight esters which are useful in a costabilizer system for polyolefins. More particularly, the invention is concerned with compositions of matter which when used with a hindered phenol produce a synergistic effect in stabilizing polyolefins against oxidative degradation. In its more specific aspects, the invention is concerned with several new sulfur-containing ester compounds which are useful as co-stabilizers with a hindered phenol when incorporated in solid polyolefins.

DESCRIPTION OF THE PREFERRED EMBODIMENTS

The esters of the present invention are formed from the reaction of a sulfur-containing carboxylic acid and a cyclic terpene alcohol or a hydrogenated derivative of a cyclic terpene alcohol. The esterification is carried out in the usual manner wherein the acid and alcohol are mixed or dissolved in a suitable solvent with a catalytic amount of a mineral acid, and the water formed in the reaction is removed by suitable means. Preferred solvents for the esterification are aromatic compounds such as benzene, toluene or xylene. The mineral acids commonly used are hydrochloric, sulfuric and toluene sulfonic acid. The mixture of the acid and alcohol is heated to reflux temperatures until the equivalent amount of water to form the ester is removed.

The preferred sulfur-containing carboxylic acids which may be suitably used to form the esters of the present invention are preferably the thiodialkanoic acids or alkyl mercaptoalkanoic acids having the following structures:

where

R is —CH$_2$(CH$_2$)$_n$COOH,
R' is —CH$_2$(CH$_2$)$_n$COOH, or
alkyl and $n$ is 1 to 5.

Specific acids suitable in the present invention are thiodipropionic acid, thiodibutyric acid, thiodihexanoic acid, hexadecyl mercaptopropionic acid, octadecyl mercaptobutyric acid, ethyl mercaptohexanoic acid, and lauryl mercaptobutyric acid. Also acids of the following formulae may be used:

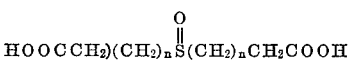
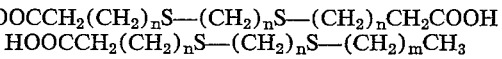

$n=1$ to 5
$m=1$ to 16

The alcohols used to form the esters of the present invention are cyclic terpene alcohols or the hydrogenated derivatives of cyclic terpene alcohols, and preferably are abietyl alcohols and isomers thereof having the following formulae:

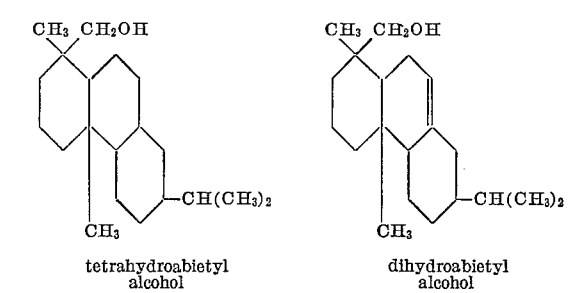

tetrahydroabietyl alcohol        dihydroabietyl alcohol

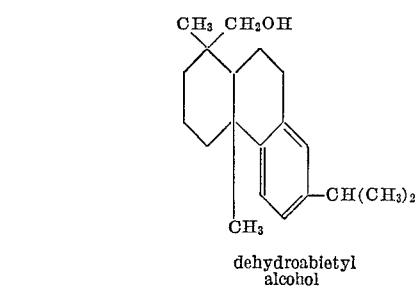

dehydroabietyl alcohol

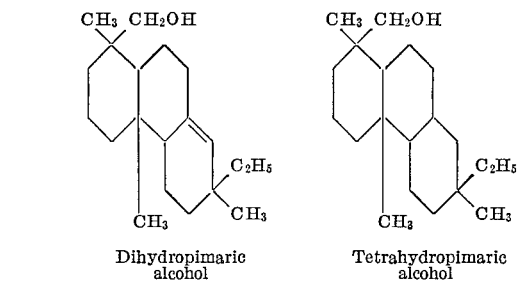

Dihydropimaric alcohol        Tetrahydropimaric alcohol

The term abietyl alcohol is defined and used herein to mean the alcohols derived from abietic acid and all the isomers thereof which includes all of the foregoing formulae as well as mixtures thereof. The term abietyl group is used herein to mean the group derived from the abietyl alcohols. Other suitable alcohols are bicyclic monoterpenes such as borneol and the monocyclic monoterpenes illustrated by α-terpineol, β-terpineol, γ-terpineol and menthol. Also suitable as alcohols for preparing the esters of the present invention are the hydrogenated cyclic terpene alcohols which are saturated. Thus, dihydroabietyl alcohol and dehydroabietyl alcohol may be hydrogenated to form tetrahydroabietyl alcohol, dehydropimaric alcohol may be hydrogenated to form tetrahydropimaric alcohol, and α-terpineol, β-terpineol, and γ-terpineol when hydrogenated form the corresponding saturated dihydroterpineol.

In the preparation of esters of the present invention for use as a costabilizer in polyolefins, a mixture of esters as well as a single ester may be formed. Thus, a mixture of the sulfur-containing carboxylic acids may be used or a mixture of cyclic terpene alcohols or a mixture of both acids and alcohols. A particularly suitable costabilizer is prepared when a mixture of tetrahydroabietyl alcohol, dihydroabietyl alcohol and dehydroabietyl alcohol is used to form mixed esters.

The polyolefin polymers treated in accordance with the present invention may be suitably exemplified by polyethylene, polypropylene, ethylene-propylene copolymers, ethylene-butene-1 copolymers, ethylene-pentene-1 copolymers, and the like, and are preferably solid polymers having molecular weights in the range from about 10,000 to about 1,000,000. These solid polymers may be produced by the polymerization of the corresponding olefins employing the Ziegler-type polymerization catalyst in a manner well known to the art.

The phenolic portion of the new stabilizer system of the present invention is a hindered phenol. The term "hindered phenol" is defined as a phenol having at least one $C_4$ or greater tertiary alkyl group in the position ortho to the hydroxy group. The hindered phenols may be suitably exemplified by 2,6-di-t-butyl-4-methylphenol; 2-t-butylphenol; 4,4′-butylidenebis(3-methyl-6 - t - butylphenol); 2,2′-methylenebis(4-methyl-6-t-butylphenol); 4,4′-methylenebis(2,6-di-t-butylphenol); 4,4′ - (1,1 - butylidenebis(3-methyl-6-t-butylphenol); $\alpha^2,\alpha^6$ - bis(3-t-butyl-5-methyl-2-hydroxyphenyl)-mesitol; 4,4′ - thiobis(2-methyl-6-t-butylphenol); and the like.

The preparation of the esters of the present invention is illustrated by the following examples which are merely illustrative since the other cyclic terpene alcohols and sulfur-containing carboxylic acids will form esters in substantially the same manner.

Example 1

A mixture of tetrahydroabietyl alcohol, dihydroabietyl alcohol and dehydroabietyl alcohol (350 g.) and 0.5 mol (89 g.) of thiodipropionic acid are dissolved in one liter of benzene in a flask equipped with magnetic stirring and a water separator. Five drops of concentrated sulfuric acid are added, and the mixture heated to reflux and refluxed for three days while collecting 17.2 g. of water. The mixture is cooled to room temperature and then the benzene removed on a Rinco rotating evaporator. The resulting product is dissolved in ether, washed with three portions of water, dried over Drierite and the ether removed on a Rinco rotating evaporator. The desired product, a mixture of esters, 369 g., is recovered as a colorless, very viscous liquid. The ester structures are confirmed by NMR and IR analyses. Found: C, 77.22%; H, 10.63%; O, 8.66%; and S, 4.40%. The foregoing analysis shows that the mixture of esters is formed.

Example 2

A mixture of the tetrahydroabietyl alcohol, dihydroabietyl alcohol and tetrahydroabietyl alcohol is dissolved in ether, Raney nickel added, and then hydrogen is passed in until all the starting material is converted to the tetrahydroabietyl alcohol. The solution is filtered and the ether removed on a Rinco rotating evaporator to recover the tetrahydroabietyl alcohol.

Example 3

Tetrahydroabietyl alcohol (292 g., 1.0 mol) obtained from Example 2 and thiodipropionic acid (89 g., 0.5 mol) are dissolved in one liter of benzene in a flask equipped with magnetic stirring and a water separator. Two drops of concentrated sulfuric acid are added, and the mixture heated to reflux and refluxed for two days while collecting water. The mixture is cooled to room temperature and then the benzene removed on a Rinco rotating evaporator. The last traces of benzene are removed with heat lamps. There is obtained a colorless, very viscous liquid which is shown by analyses to be ditetrahydroabietyl thiodipropionate.

Example 4

A mixture of dihydropimaric alcohol and tetrahydropimaric alcohol is admixed with thiodipropionic acid in a flask equipped with a magnetic stirring device and a water separator. Concentrated sulfuric acid is added and the mixture is heated to reflux while collecting the equivalent amount of water. The resulting product is worked up similarly as in Example 1 and the product is a mixture of esters.

Example 5

A mixture of dihydropimaric alcohol and tetrahydropimaric alcohol is dissolved in ether, Raney nickel added, and then hydrogen is passed through the mixture until all of the mixture is converted to the tetrahydropimaric alcohol. The solution is filtered and the ether removed to recover the tetrahydropimaric alcohol.

Example 6

Tetrahydroabietyl alcohol and dithiodipropionic acid are dissolved in benzene, concentrated sulfuric acid is added, and the mixture heated to reflux while collecting water in a water separator. The product obtained after workup similarly in Example 1 is ditetrahydroabietyl-dithiodipropionate.

Example 7

Tetrahydroabietyl alcohol and sulfoxydipropionic acid are dissolved in benzene, concentrated sulfuric acid is added, and the mixture heated to reflux while collecting water in a water separator. The product obtained after workup similarly as in Example 1 is ditetrahydroabietyl-sulfoxydipropionate.

Example 8

Tetrahydropimaric alcohol and 4,6-dithiaazelaic acid are refluxed similarly as in Example 1 and the product obtained after workup is ditetrahydropimaric-4,6-dithiaazelate.

The esters formed are used in a stabilizer system and incorporated in polyolefins in the amount from about 0.01 to about 1.5 percent by weight with a preferred amount of about 0.1 to about 1.0 percent by weight. The esters are incorporated in the polyolefins with a hindered phenol, and the phenols are used in the amount from about 0.01 to about 1.5 percent by weight with a preferred amount from about 0.1 to about 0.7 percent by weight. The esters of the present invention and the hindered phenols may be incorporated in the polyolefin by forming a solution thereof in a suitable solvent such as aromatic, paraffinic or naphthenic hydrocarbon. Suitable solvents may be illustrated by xylene, hexane or cyclohexane and other members of these series. The synergistic mixture of the present invention may be sprayed over the pellets or particles of the polyolefins, and the resulting mixture may then be extruded through a suitable extrusion device to cause the formation of the homogeneous mixture. The synergistic mixture may also be added to the polymer particles without a solvent, and the resulting mixture subjected to milling, extrusion or some other process to cause intimate mixture of the stabilizer system with the polymer composition.

The present invention will be further illustrated by the following data which are given by way of illustration and not by limitation from the scope of the present invention.

The compatibility of the stabilizer systems is tested using polypropylene and propylene-ethylene block copolymer as examples of polyolefins in forming compression-molded plaques (4" x 4" x 75 mils). Samples are prepared of these polymers stabilized with the various esters of the present invention as costabilizers with the hindered phenols described above which form the synergistic stabilizer system. The plaques are allowed to stand at room temperature and are examined periodically for compatibility of the stabilizers. Those ester costabilizers which are not compatible with the polymer slowly exude to the surface forming a dull film which is easily detected by visual observation and which can be removed and identified by suitable analytical tests. The test is usually carried out with dipinene-diphenol as the hindered phenol since it is completely compatible with the polyolefins. It is found that the ester costabilizers of the present invention did not exude even after eight weeks as illustrated below:

exudes is totally unacceptable since a polyolefin would have a dull film of the costabilizer on the surface. On the other hand, a costabilizer which is nonvolatile is necessary when the polyolefin is processed. In the extrusion of monofilament, processing temperatures are often used wherein loss of costabilizer heretofore has occurred due to the volatility of the costabilizer. Furthermore, there are many applications for polyolefins wherein the operating conditions are such that a nonvolatile stabilizing system is required. Thus, parts for the inside of dishwasher, driers, electrical equipment, etc. all require a polyolefin having a nonvolatile stabilizing system.

While the nonexuding and nonvolatile characteristics of the esters of the present invention have been emphasized to show their uniqueness, they are nevertheless effective costabilizers with hindered phenols to stabilizer against oxidative degradation of the polyolefins. Thus, the esters of the present invention are as effective as costabilizers as the costabilizers of the prior art.

The nature and objects of the present invention having been completely described and illustrated and the best

TABLE I

| Polymer | Costabilizer | Wt. percent | Exuding After 3 weeks | Exuding After 8 weeks |
|---|---|---|---|---|
| Polypropylene | Dilauryl thiodipropionate [1] | 0.7 | No | No |
| Do | Dihexadecyl thiodipropionate [2] | 0.7 | No | No |
| Do | Distearyl thiodipropionate [3] | 0.7 | Yes | Yes |
| Do | Dibehenyl thiodipropionate [4] | 0.7 | Yes | Yes |
| Do | Product of Example 1 | 0.7 | No | No |
| Do | Product of Example 3 | 0.7 | No | No |
| Propylene-ethylene | Dilauryl thiodipropionate | 0.7 | No | No |
| Block copolymer | Dihexadecyl thiodipropionate | 0.7 | No | No |
| Do | Distearyl thiodipropionate | 0.7 | Yes | Yes |
| Do | Dibehenyl thiodipropionate | 0.7 | Yes | Yes |
| Do | Product of Example 1 | 0.7 | No | No |
| Do | Product of Example 3 | 0.7 | No | No |

[1] $(C_{12}H_{35}OOCCH_2CH_2)_2S$
[2] $(C_{16}H_{33}OOCCH_2CH_2)_2S$.
[3] $(C_{18}H_{37}OOCCH_2CH_2)_2S$.
[4] $(C_{22}H_{45}OOCCH_2CG_2)_2S$

By another test, the volatility of the stabilizer systems is determined by aging polypropylene samples, formed by compression molding with the stabilizer system incorporated in the polypropylene, in a forced air circulating oven at 280° F. The samples are formed as pads of about 1¼" x ½" x 10 mils. Periodically, the samples are removed from the oven and analyzed for ester costabilizer content. The esters of the present invention used as a costabilizer were found to be nonvolatile as illustrated by the following data:

Table II

Costabilizer: Percent present after 40 days
   Dilauryl thiodipropionate _____ Failed in 18 days.
   Dilauryl thiodipropionate _____ Failed in 35 days.
   Distearyl thiodipropionate _____ 60.
   Dibehenyl thiodipropionate _____ 75.
   Product of Example 1 _____ 80.
   Product of Example 3 _____ 80.

[1] Determined by absorbance/mil (IR).

From Table II, it is seen that dilauryl thiodipropionate and dihexadecyl thiodipropionate are completely volatilized from the samples when subjected to circulating air at 280° F. in less than 40 days.

It is thus obvious from the foregoing that the esters of the present invention when used as costabilizers in polyolefins are both nonexuding and nonvolatile. These characteristics appear surprising since when compared to the esters of a sulfur-containing carboxylic acid and an aliphatic alcohol these two characteristics are not present in any one ester. It is emphasized that a costabilizer which mode thereof set forth, what we wish to claim as new and useful and secure by Letters Patent is:

1. A composition selected from the following general formulae:

$$ROOC(CH_2)_nCH_2\text{---}S\text{---}CH_2(CH_2)_nCOOR$$
$$ROOC(CH_2)_nCH_2\text{---}SS\text{---}CH_2(CH_2)_nCOOR$$

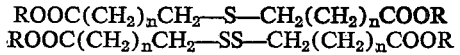

$$ROOC(CH_2)_nCH_2\text{---}S\text{---}(CH_2)_nS\text{---}CH_2(CH_2)_nCOOR$$
$$ROOC(CH_2)_nCH_2\text{---}S\text{---}(CH_2)_nS(CH_2)_mCH_3$$

where: $n$ is 1 to 5; $m$ is 1 to 16; and R is the radical derived from the group consisting of tetrahydroabietyl, dehydroabietyl, dihydroabietyl, tetrahydropimaric and dihydropimaric alcohols.

2. A composition according to claim 1 wherein R is the radical derived from tetrahydroabietyl, dehydroabietyl and dihydroabietyl alcohols.

3. A composition according to claim 1 wherein R is the radical derived from tetrahydropimaric and dihydropimaric alcohols.

4. A composition according to claim 1 wherein said general formula is $$ROOC(CH_2)_nCH_2\text{---}S\text{---}CH_2(CH_2)_nCOOR$$

5. A composition according to claim 4 wherein R is the radical derived from tetrahydroabietyl, dihydroabietyl and dehydroabietyl alcohols.

6. A composition according to claim 1 wherein said general formula is

ROOC—CH$_2$—CH$_2$—S—CH$_2$—CH$_2$—COOR

7. A composition according to claim 6 wherein R is the radical derived from tetrahydroabietyl, dihydroabietyl and dehydroabietyl alcohols.

8. A composition according to claim 6 wherein R is the radical derived from tetrahydroabietyl alcohol.

References Cited

UNITED STATES PATENTS 2,640,848  6/1953  Harman et al. _____ 260—481

LORRAINE A. WEINBERGER, Primary Examiner

E. GLEIMAN, Assistant Examiner

U.S. Cl. X.R.

260—45.85